(12) United States Patent
Bauer et al.

(10) Patent No.: US 11,502,302 B2
(45) Date of Patent: Nov. 15, 2022

(54) PROCESS FOR PRODUCING A COMPOSITE MATERIAL

(71) Applicant: Robert Bosch GmbH, Stuttgart (DE)

(72) Inventors: Harald Bauer, Ehningen (DE); Wolfgang Weydanz, Buckenhof (DE)

(73) Assignee: Robert Bosch GmbH, Stuttgart (DE)

( * ) Notice: Subject to any disclaimer, the term of this patent is extended or adjusted under 35 U.S.C. 154(b) by 273 days.

(21) Appl. No.: 16/439,782

(22) Filed: Jun. 13, 2019

(65) Prior Publication Data

US 2019/0386311 A1 Dec. 19, 2019

(30) Foreign Application Priority Data

Jun. 13, 2018 (DE) ..................... 10 2018 209 416.0

(51) Int. Cl.
| | | |
|---|---|---|
| H01M 4/62 | (2006.01) | |
| H01M 4/66 | (2006.01) | |
| H01M 10/0525 | (2010.01) | |
| H01G 11/50 | (2013.01) | |
| H01G 11/24 | (2013.01) | |
| H01G 11/48 | (2013.01) | |

(52) U.S. Cl.
CPC ............ *H01M 4/622* (2013.01); *H01G 11/24* (2013.01); *H01G 11/48* (2013.01); *H01G 11/50* (2013.01); *H01M 4/625* (2013.01); *H01M 4/665* (2013.01); *H01M 10/0525* (2013.01); *H01M 2300/0082* (2013.01); *H01M 2300/0091* (2013.01)

(58) Field of Classification Search
None
See application file for complete search history.

(56) References Cited

U.S. PATENT DOCUMENTS

| | | | |
|---|---|---|---|
| 4,153,661 A * | 5/1979 | Ree ........................ | B01D 39/00 264/120 |
| 6,306,323 B1 | 10/2001 | Chu et al. | |
| 6,589,299 B2 * | 7/2003 | Missling ............. | H01M 4/0411 29/623.5 |
| 7,342,770 B2 | 3/2008 | Mitchell et al. | |
| 2015/0303481 A1 | 10/2015 | Duong et al. | |

FOREIGN PATENT DOCUMENTS

| | | |
|---|---|---|
| DE | 102004012476 | 10/2005 |
| DE | 102011109813 A1 | 2/2013 |
| DE | 102016215338 A1 | 2/2018 |
| EP | 2357046 | 8/2011 |
| WO | 2005008807 | 1/2005 |
| WO | 2005049700 | 6/2005 |
| WO | 2017127922 | 8/2017 |

* cited by examiner

*Primary Examiner* — Zhongqing Wei
(74) *Attorney, Agent, or Firm* — Michael Best & Friedrich LLP

(57) ABSTRACT

A process for producing a composite material comprising at least one particulate material and at least one polymeric binder, wherein the at least one particulate material and the at least one polymeric binder are mixed with one another and mechanically processed in the presence of at least one process auxiliary which reduces the mechanical and/or chemical interaction between the surfaces of the at least one particulate material and of the at least one polymeric binder, essentially dispensing with the use of solvents, characterized in that the weight ratio of process auxiliary to polymeric binder is within a range from 3:10 to 0.1:20.

13 Claims, No Drawings

PROCESS FOR PRODUCING A COMPOSITE MATERIAL

BACKGROUND OF THE INVENTION

The invention relates to a process for producing a composite material comprising at least one particulate material and at least one polymeric binder, and especially such a process wherein the composite material comprises a high proportion of particulate material. The composite material obtained is essentially free of pores and can be processed to give then layers or films. The process can advantageously be used in the production of electrodes.

Solid-state polymer electrolyte batteries are notable for the absence of liquid constituents, especially of liquid electrolytes, in the battery cell. Typical, solid-state polymer electrolyte batteries comprise at least one negative electrode (also called anode), at least one positive electrode (also called cathode), and a polymer electrolyte layer that separates the electrodes from one another. The electrodes frequently comprise composite materials comprising a particulate active material, optionally electrical conductive additives, and an ionically conductive polymer electrolyte.

The processes described in the prior art that are suitable for production of such composite materials are typically based on the suspending of the particulate constituents in a fluid, such as a solvent, a binder solution or a binder melt. After the removal of the solvent or the cooling of the binder melt, what remains is the finished composite material. However, it is necessary here to use large amounts of fluid. This can result in the formation of unwanted voids in the composite material if the fluid is a solvent which is removed in an additional operating step. By contrast, large amounts of binder result in a reduction in the proportion of active material in the electrode. This leads to a reduced energy density of the electrode.

Alternative processes work in an essentially solvent-free manner and are based on the fibrillation of the binder in a dry mixture of particulate constituents and binder through the action of shear forces in order thus to bring about the formation of a polymer matrix that binds the active material particles to one another. In the case of sensitive materials, for example (polymer-) coated particles (cf. WO 2017/127922), the necessary action of forces can lead to damage. The proportion of binder is comparatively high and is frequently above 20% by weight of the composite material. Pore-free composite materials are producible only with difficulty by this process.

WO 2005/008807 discloses a process for producing an electrode in which carbon particles and binder particles are mixed with one another in dry form and the binder particles are then fibrillated with use of shear forces in order thus to produce a binder matrix. Preference is given here to dispensing with the use of processing auxiliaries. Similar processes are disclosed in U.S. Pat. No. 7,342,770 and EP 2 357 046.

DE 10 2004 012 476 discloses a process for producing a lithium polymer battery cell which comprises the extrusion of a dry electrode active material composition with supply of ethylene carbonate at elevated temperatures. The ethylene carbonate accounts for 10% to 40% by mass of the total mass of the composition.

U.S. Pat. No. 6,589,299 describes a process for bonding electrode constituents which is conducted essentially without solvent in a single-screw extruder (cf. also U.S. Pat. No. 6,306,323).

U.S. Pat. No. 4,153,661 describes a process for producing a polytetrafluoroethene-comprising composite material which is obtained by mixing a particulate material and PTFE particles in the presence of water at a temperature of 50 to 100° C. in a high-speed stirrer in order thus to achieve fibrillation of the PTFE particles, and subsequently calendering the mixture thus obtained at 50 to 100° C.

WO 2005/049700 discloses a process for producing polymer composites produced from one or more shearable substances, one or more materials and shearable polymer particles, wherein the polymer particles have a proportion of 0.1% to 20% by weight in the total mass of the end product, and wherein the size ratio of shearable substance to polymer particles is from 5:1 to 2000:1. The process includes the dispersing of the substances in a solvent to give a paste which is subsequently mixed vigorously and rolled out.

US 2015/303481 describes a composite binder for an electrode of an energy storage device, said composite binder comprising polytetrafluoroethene (PTFE) and at least one selected from polyvinylidene fluoride (PVDF), a PVDF copolymer and polyethylene oxide (PEO), preferably in a mass ratio of 1:3 to 3:1.

SUMMARY OF THE INVENTION

The invention provides a process for producing a composite material comprising at least one particulate material and at least one polymeric binder, wherein it is possible to dispense with the use of solvents and it is possible to reduce the proportion of polymeric binder as far as possible.

The present invention relates to a process for producing a composite material comprising at least one particulate material and at least one polymeric binder, wherein the at least one particulate material and the at least one polymeric binder are mixed with one another and mechanically processed, especially kneaded, extruded and/or calendered, in the presence of at least one process auxiliary which reduces the mechanical and/or chemical interaction between the surfaces of the at least one particulate material and of the at least one polymeric binder, essentially dispensing with the use of solvents, characterized in that the weight ratio of process auxiliary to polymeric binder is within a range from 3:10 to 0.1:20.

The particulate material according to the present invention preferably has an average particle diameter of 0.1 to 50 µm, more preferably 0.2 to 10 µm.

Suitable particulate materials are not especially restricted. In a preferred embodiment of the invention, the particulate material especially comprises at least one material suitable for the production of electrodes of electrochemical cells, such as battery cells, especially lithium ion battery cells, supercapacitors, hybrid supercapacitors, or for the production of gas diffusion electrodes, for example for fuel cells.

Suitable particulate materials that should be emphasized are especially:

cathode active materials for lithium battery cells, especially layered oxides such as lithium nickel cobalt aluminum oxides (NCAs; for example of the composition $LiNi_{0.8}Co_{0.15}Al_{0.05}O_2$), lithium nickel cobalt manganese oxides (NCMs; various stoichiometry, e.g. $LiNi_{0.8}Mn_{0.1}Co_{0.1}O_2$ (NMC (811)), $LiNi_{0.33}Mn_{0.33}Co_{0.33}O_2$ (NMC (111)), $LiNi_{0.5}Mn_{0.3}Co_{0.2}O_2$ (NMC (532)), $LiNi_{0.6}Mn_{0.2}Co_{0.2}O_2$ (NMC (622)), or high-energy lithium nickel cobalt manganese oxides (overlithiated lithium nickel cobalt manganese oxides), layered oxides, for example $LiNi_{1.5}Mn_{0.5}O_2$, $LiCoO_2$, olivines such as lithium iron phosphate ($LiFePO_4$, LFP), lithium manganese phosphate (LMP) or lithium cobalt phosphate (LCP), spinels such as $LiMn_2O_4$, $Li_2MnO_3$, $Li_{1.17}Ni_{0.37}Co_{0.1}Mn_{0.56}O_2$ or $LiNiO_2$, lithium-rich compounds such as $Li_2MO_2F$ (with M=V, Cr), and conversion material such as $FeF_3$, sulfur-containing materials such as SPAN; anode active materials for lithium battery cells, especially carbon derivatives such as graphite, amorphous carbon, heart carbon, soft carbon, silicon, especially nanocrystalline amorphous silicon, alloys or alloy-carbon composites and lithium titanate ($Li_4Ti_5O_{12}$);

materials suitable for forming a particulate or fibrous matrix as gas diffusion electrode for a polymer electrolyte membrane fuel cell, for example graphite, Teflon, polyethylene, carbon fiber composites or felts;

inorganic solid-state electrolytes such as lithium ion-conducting sulfidic, oxidic or phosphatic glasses, garnets (lithium lanthanum zirconates (LLZO)), perovskites (LLTO), glass ceramics of the NASICON type, and argyrodites.

In addition, conductive additions such as carbon blacks or finely divided carbon particles or carbon fibers etc. having particle sizes of 50 nm to 50 μm may be added as particulate additions in a small percentage to the particulate materials. These conductive additives are preferably used in amounts of 0.1-5% by weight based on the total weight of the composite composition, especially in amounts of 0.5-3% by weight.

The polymeric binder is likewise not especially restricted, provided that it has sufficient adhesive action with respect to the particulate material. It is typically likewise used in the form of particles having an average particle diameter of 200 nm to 100 μm, and large binder particles in particular may be melted, dissolved or comminuted in the case of processing by vigorous mixing.

In one embodiment of the invention, the polymeric binder or one component thereof is ionically conductive, especially for lithium ions. Preferably, the polymeric binder comprises at least one polymer electrolyte. In one embodiment of the invention, the polymeric binder comprises a mixture of at least one binder to bring about adhesion and at least one polymer electrolyte to bring about ionic conductivity. In an alternative embodiment, the polymeric binder consists of at least one polymer electrolyte. In this case, the polymer electrolyte brings about both the adhesion and the ionic conductivity.

Polymer electrolytes generally comprise at least one organic polymer and a conductive salt to provide the conductive ions. In lithium (ion) batteries, lithium salts are used for the purpose. Suitable organic polymers that should be emphasized are polyalkylene oxide derivatives of polyethylene oxide, polypropylene oxide and the like or polymers comprising polyalkylene oxide derivatives; derivatives of polyvinylidene fluoride (PVDF), polyhexafluoropropylene, polycarbonates, polyphosphoric esters, polyalkylimines, polyacrylonitrile, poly(meth)acrylic esters, polyphosphazenes, polyurethanes, polyamides, polyesters, polysiloxanes, polymalonic esters, polymalonic ethers and the like, and polymers comprising derivatives thereof. Preference is given to polymer compounds having an oxyalkylene structure, a urethane structure or a carbonate structure in the molecule. For example, polyalkylene oxides, polyurethanes and polycarbonates are preferred with regard to their good electrochemical stability. Also preferred are polymers having a fluorocarbon group. Polyvinylidene fluoride and polyhexafluoropropylene are preferred with regard to their stability. The number of repeat units in these oxyalkylene, urethane, carbonate and/or fluorocarbon units is preferably within a range from in each case 1 to 1000, more preferably a range from 5 to 100.

For provision or improvement of ion conductivity, conductive salts are typically added to the polymers of the polymer electrolytes. Suitable conductive salts are especially lithium salts. The conductive salt may be selected, for example, from the group consisting of lithium halides (LiCl, LiBr, LiI, LiF), lithium perchlorate ($LiClO_4$), lithium tetrafluoroborate ($LiBF_4$), lithium hexafluorophosphate ($LiPF_6$), lithium hexafluoroarsenate ($LiAsF_6$), lithium nitrate ($LiNO_3$), lithium trifluoromethanesulfonate ($LiSO_3CF_3$), lithium bis(fluorosulfonyl)imide ($Li[N(SO_2F)_2]$, LiFSI), lithium bis(trifluoromethylsulfonyl)imide ($Li[N(SO_2(CF_3))_2]$, LiTF SI), lithium bis(pentafluoroethylsulfonyl)imide ($LiN(SO_2C_2F_5)_2$, LiBETI), lithium bis(oxolato) borate ($LiB(C_2O_4)_2$, LiBOB), lithium difluoro(oxolato) borate ($Li[BF_2(C_2O_4)]$, LiDFOB), lithium difluorotri (pentafluoroethyl)phosphate ($LiPF_2(C_2F_5)_3$) and combinations thereof. More preferably, the at least one ionic compound comprises at least one lithium salt selected from lithium hexafluorophosphate ($LiPF_6$), lithium iodide (LiI), lithium bis(fluorosulfonyl)imide ($Li[N(SO_2F)_2]$, LiFSI) and lithium bis(trifluoromethylsulfonyl)imide ($Li[N(SO_2(CF_3))_2]$, LiTFSI) and combinations thereof.

These may each be used individually or in combination with one another. Preferably, the at least one conductive salt accounts for a proportion of 10% to 90% by weight, especially 20% to 60% by weight, of the total weight of the ion-conducting polymer (organic polymer plus conductive salt).

Suitable further polymeric binders are especially carboxymethyl cellulose (CMC), styrene-butadiene copolymer (SBR), polyvinylidene fluoride (PVDF), polytetrafluoroethene (PTFE), polyacrylonitrile (PAN) and ethylene-propylene-diene terpolymer (EPDM).

Useful polymeric binders in gas diffusion electrodes additionally include polymers that are notable for their hydrophilic and/or hydrophobic properties. Particular preference is given to using polyether sulfone (PES).

It is a feature of the process auxiliaries used in accordance with the invention that they reduce the mechanical and/or chemical interaction between the surfaces of the at least one particulate material and the at least one polymeric binder. The process auxiliaries are preferably selected from solid-state lubricants, separating agents and combinations of these.

It is a feature of a solid-state lubricant of the invention that it is solid at the temperatures that prevail on performance of the process of the invention and enables slipping of adjoining particles. This can be achieved in that the surface of the solid-state lubricant itself has particularly low adhesive action. For example, mention may be made of wholly or partly fluorinated surfaces. Alternatively, the slipping can be achieved by means of a laminar solid-state lubricant, the individual layers of which can slide past one another.

Suitable solid state lubricants that should be particularly emphasized are:
wholly or partly fluorinated polymers such as polytetrafluoroethene (PTFE), polyvinylidene fluoride (PVdF), and copolymers comprising repeat tetrafluoroethene and/or fluoride units;
carbon polymorphs, such as graphite in particular;
layered inorganic compounds such as molybdenum sulfide;

compounds having a low melting temperature, preferably especially a melting temperature between 25° C. and 75° C., especially 30° C. and 50° C., such as ethylene carbonate.

Suitable separating agents are especially inorganic compounds having high chemical and/or high electrochemical stability, especially at high electrochemical potentials of >4 V, preferably ≥5 V, relative to Li/Li$^+$. Emphasis should be given to oxides, such as $SiO_2$, $Al_2O_3$, ZrO, $B_2O_3$, PbO, carbides such as SiC, and nitrides such as BN.

It is additionally a feature of the process auxiliaries that they are preferably not chemically or electrochemically reactive toward the other constituents of the composite material.

In a particularly preferred embodiment, at least one polymer, especially a wholly or partly fluorinated polymer, is used as process auxiliary.

The process auxiliary is preferably used in the form of particles. In a preferred embodiment, the process auxiliary particles have an average particle diameter selected such that the ratio of the average particle diameter of the particulate material to the average particle diameter of the particulate process auxiliary is within a range from 2000:1 to 0.4:1. In one embodiment of the invention, the ratio of the average particle diameter of the particulate material to the average particle diameter of the particulate process auxiliary is within preferably a range from 250:1 to 2:1, more preferably 50:1 to 10:1 and especially 40:1 to 20:1. In an alternative embodiment of the invention, the ratio of the average particle diameter of the particulate material to the average particle diameter of the particulate process auxiliary is within preferably a range from <5:1 to 0.4:1, more preferably 4.5:1 to 0.5:1 and especially 4:1 to 1:1.

Preferably, the average particle diameter of the process auxiliary particles is within a region of less than 500 nm, especially from 10 to 200 nm.

In a particularly preferred embodiment, process auxiliaries used are at least fluorinated particles such as PTFE particles or PVDF particles having an average particle diameter within a range from 10 to 200 nm and/or wherein the average particle diameter is selected such that the ratio of the average particle diameter of the particulate material to the average particle diameter of the particulate process auxiliary is within a range from 2000:1 to 0.4:1. In one embodiment of the invention, the ratio of the average particle diameter of the particulate material to the average particle diameter of the fluorinated particulate process auxiliary is within preferably a range from 250:1 to 2:1, more preferably 50:1 to 10:1 and especially 40:1 to 20:1. In an alternative preferred embodiment of the invention, the ratio of the average particle diameter of the particulate material to the average particle diameter of the fluorinated particulate process auxiliary is within preferably a range from <5:1 to 0.4:1, more preferably 4.5:1 to 0.5:1 and especially 4:1 to 1:1.

The process of the invention comprises the providing of a composition composed of the at least one particulate material, the at least one polymeric binder, and the at least one process auxiliary. This composition is also referred to herein as composite composition. In addition, it is possible to use further additives in the process of the invention, such as, in particular, conductivity additives which increase electrical conductivity. Suitable conductivity additives are, for example, conductive carbon black, carbon nanotubes or graphite.

In this case, the graphites may advantageously be selected such that they can fulfill both the function of increasing the electrical conductivity and the function of reducing the mechanical interaction between the surfaces of the particulate material. The sliding on the graphite planes may be advantageous here for the electrical conductivity in the electrode in that the surface area of the graphite is increased and hence so is the conductivity in the electrode since more network pathways are formed as a result of the increased particle count in the graphite particles. Particularly suitable graphites are therefore those with a two-dimensional, unfolded structure and particle forms in which the planes can slip past one another.

It has been found that even small amounts of process auxiliaries are sufficient, in the process of the invention, to obtain composite compositions that can be mechanically processed without damage to the particulate material, especially by mixing, kneading, extruding and/or rolling. Typically 0.1% to 3% by weight of process auxiliaries are sufficient here, based on the total weight of the composite composition. Preferably 0.1% to 2% by weight of process auxiliaries are used, and especially 0.2% to 1% by weight, based in each case on the total weight of the composite composition.

The use even of such small amounts of process auxiliaries of the invention enable a reduction in the proportion of polymeric binder in the composite composition without observation of excessive mechanical and/or chemical interaction between the particles of the particulate material or between the binder particles. As a result, the composite composition obtained by the process is processible by conventional methods and in an essentially solvent-free manner (i.e. less than 1% by weight of solvent based on the total weight of the composite composition).

It is typically possible by the process to increase the proportion of particulate material in the composite composition to more than 85% by weight.

A preferred composite composition has, for example, the following composition:
  85.0% to 98.9% by weight of the at least one particulate material;
  1.0% to 14.9% by weight of the at least one polymeric binder;
  0.1% to 3.0% by weight of the at least one process auxiliary; and
  0% to 10% by weight of further additives,
  based in each case on the total weight of the composite composition.

In a first process step, the constituents of the composite composition are provided. These may be provided separately from one another or in the form of a mixture. Any process known to those skilled in the art is suitable for this purpose, provided that the function of the constituents is not adversely affected or destroyed by the mixing process.

In one embodiment of the invention, a mixture is first produced from the at least one particulate material, the at least one polymeric binder and any additives added. The process auxiliary is added in a second process step. This can be effected by means of a mixing process or in the course of mechanical processing in a kneader, extruder and/or calender (roll system).

In an alternative embodiment of the invention, the at least one particulate material and/or the at least one polymeric binder are first mixed separately from one another with at least one process auxiliary in order to avoid damage to the particulate material or agglomeration of the polymeric binders. Preferably, the particulate material is mixed with at least one solid-state lubricant. Preferably, the polymeric binder is mixed with at least one separating agent. In one embodiment, a combination of these measures is undertaken. By mixing the individual compositions thus obtained, the composite composition can be obtained. This can be effected by means of a mixing process or in the course of mechanical processing in a kneader, extruder and/or calender (roll system).

In a further alternative embodiment, agglomerates are first formed from a portion of the components, for example from particulate material and polymeric binder. The agglomerates can be formed, for example, by kneading the constituents. The agglomerates are subsequently mixed with the at least one process auxiliary and processed to give a composite material by means of the mechanical processing in the kneader, extruder and/or calender (roll system).

The process is typically conducted at temperatures of 0° C. to 150° C., preferably 20° C. to 120° C. and especially 30° C. to 100° C. Particular preference is given to employing, at least in one process step, temperatures that permit softening of the polymeric binder up to or close to its melting point.

The process of the invention comprises at least one process step in which a mixture comprising the at least one particulate material, the at least one polymeric binder and the at least one process auxiliary is processed mechanically. This may be a kneading, extruding and/or calendering process.

In one embodiment of the process of the invention, the weight ratio of process auxiliary to polymeric binder is within a range from 3:10 to 0.1:20, preferably 2:10 to 0.1:10. In this case, the polymeric binder is a polyalkylene oxide-containing polymer electrolyte, especially a polymer electrolyte based on polyethylene oxide, and the process auxiliary is a solid-state lubricant based on PTFE, especially PTFE particles.

In a particularly preferred embodiment of the process of the invention, the particulate material comprises at least one electrode active material for an electrochemical energy storage means and the polymeric binder comprises at least one polymer electrolyte.

The particulate material preferably accounts for at least 85% by weight of the constituents used (i.e. based on the total weight of the composite composition).

The process of the invention is especially suitable for production of essentially pore-free composite materials, preferably in the form of a homogeneous layer or homogeneous self-supporting film having a thickness of less than 300 μm, especially of 50-200 μm. The width and length of the layer or self-supporting film is unlimited. Typically, the layer or self-supporting film has a width of more than 20 mm, preferably more than 60 mm. The length is frequently more than 50 mm and up to 5000 mm. Alternatively, the layer or self-supporting film may also be produced continuously, i.e. "endlessly".

The invention also provides a composite material comprising at least one particulate material, at least one polymeric binder and at least one process auxiliary that reduces the mechanical and/or chemical interaction between the surfaces of the at least one particulate material and the at least one polymeric binder. With regard to the constituents of the composite material, especially the at least one particulate material, the at least one polymeric binder, the at least one process auxiliary and any further additives present, the embodiments and definitions made above are applicable. Preferably, the composite material of the invention is obtained by the above-described process of the invention.

In a preferred embodiment, the composite material comprises at least one electrode active material as particulate material and at least one polymer electrolyte as polymeric binder.

It is a feature of the composite material of the invention that it is essentially pore-free, meaning that the void content in the composite material is less than 5% by volume, preferably less than 2% by volume and especially less than 1% by volume, based on the total volume of the composite material.

In a particularly preferred embodiment, the composite material has the following composition:
- 85.0% to 98.9% by weight of the at least one particulate material;
- 1.0% to 14.9% by weight of the at least one polymeric binder;
- 0.1% to 3.0% by weight of the at least one process auxiliary; and
- 0% to 10% by weight of further additives,
- based in each case on the total weight of the composite composition.

The invention also provides for the use of the composite material of the invention, preferably obtained by the process of the invention, as an electrode in an electrochemical energy storage device, especially in a battery cell, preferably a lithium battery cell, in a supercapacitor, in a hybrid supercapacitor or in an electrochemical energy converter device, especially in a fuel cell.

The invention likewise provides an electrochemical energy storage device, preferably a battery cell, especially a lithium ion battery cell, a supercapacitor, a hybrid supercapacitor or an electrochemical energy converter device, especially a fuel cell, comprising at least one composite material of the invention.

The process of the invention enables essentially solvent-free production of composite materials having a high proportion of particulate material. This enables the production of electrodes for electrochemical cells having a high active material content and associated high volumetric energy density. The volumetric energy density of the electrode is additionally increased because it is largely free of pores.

Further advantages result from the dispensing with the use of solvents as fluidization aids, which typically have to be removed in an additional process step. For instance, it is possible to reduce production costs and production time. The cell qualities are likewise improved and environmental effects are reduced.

In addition, the process of the invention is particularly gentle especially in mechanical terms, and thus enables the production of composite materials having a high proportion of particulate materials without causing damage thereto. Particularly the use of core-shell particles (e.g. active material particles with outer layers of other materials or polymer coating or other coatings or protective layers) and the use of fine active material particles (e.g. lithium iron phosphate having an average particle diameter of about 0.5 μm) can thus be processed without solvent and without damage.

It is a further feature of the process of the invention that it is possible to conduct a conventional extrusion process at lower backpressure, and hence with lower evolution of heat. This results in a reduction in damage to the polymer electrolyte, for example through chain degradation or active material damage via surface damage or particle fracture.

The composite compositions of the invention are notable for good flowability or free flow. They can be extruded to broad and thin films (for example by means of slot dies). The layer thicknesses of the materials or films can be reduced without difficulty, especially by rolling the composite compositions in the form of mixtures or preagglomerated mixtures in a roller system.

EMBODIMENTS OF THE INVENTION

The working examples which follow illustrate the subject matter of the invention.

Composite compositions having the following composition are provided:
- polymeric binder(s): 0.1-5% by weight, especially 0.2-3% by weight;
- process auxiliary/auxiliaries: 0.5-2% by weight;
- conductivity additive in the production of an anode: 0-2% by weight or
- conductivity additive in the production of a cathode: 1-5% by weight, especially 1.5-3% by weight.

The remaining proportion of the composite composition is formed by the at least one particulate material, resulting in a total amount of 100% by weight based on the total weight of all constituents of the composite composition.

The examples which follow give a detailed description of the selection of the individual components and processing thereof.

Example 1

Active material (lithium iron phosphate) having an average particle diameter of 0.5 μm, process auxiliaries (preferably graphite, PTFE and/or molybdenum sulfide) having an average particle diameter of 0.5 μm to 10 μm, conductive carbon black (C65) and polymer electrolyte (mixture of polyethylene oxide, for example having a chain length of 600 000 g/mol, and LiTFSi) are mixed in dry form, the PEO is at least partly melted or dissolved, and the mixture obtained is extruded in an extruder through a die. The film thus obtained is rolled to target thickness in a roll mill.

Example 2

Active material (e.g. mixed lithium nickel cobalt manganese oxide) having an average particle diameter of 10 μm, process auxiliaries (graphite having an average particle diameter of 0.5 μm to 10 μm or PTFE having an average particle size of 2 μm to 10 μm, conductive carbon black (e.g. C65) and polymer electrolyte (mixture of polyethylene oxide, for example having a chain length of 600 000 g/mol, and LiTFSi) are mixed in dry form, the PEO is at least partly melted, and the mixture obtained is extruded in an extruder through a die. The film thus obtained is rolled to target thickness in a roll mill.

Example 3

The active material is processed with a portion of polymer electrolyte (mixture of polyethylene oxide, for example having a chain length of 600 000 g/mol, and LiTFSi) and a portion of conductive carbon black (e.g. C65) to give agglomerates (for example by means of a melting process, kneading, application of solvent, or fluidized bed process). The agglomerates are mixed with the process auxiliary in order to be able to move the agglomerates easily counter to one another in the course of extruding or rolling. Subsequent forming of the film by extruding a film or rolling the agglomerates together in a calender, possibly with simultaneous degassing or application of a reduced pressure, to give a film.

Example 4

A separating agent is deliberately applied to a polymer that (partly) forms the polymeric binder or is selected in order that the polymer can be processed better. The separating agent is chemically and/or electrochemically stable in an electrochemical cell under all operating conditions. The separating agent may be a further polymer (for example PTFE) or an inert, preferably inorganic, separating agent. Preferably, an electrochemically inert separating agent (which is also stable at electrochemical potentials up to and above 5 V vs. Li/Li$^+$) is used for this purpose, for example $Al_2O_3$, ZrO, SiC, BN, or further very stable oxides, carbides or similar (electro)chemically very stable substances.

Example 5

A separating agent is used as in example 4. However, this is selected such that the separating agent breaks down in the electrochemical cell and/or takes place in the cell reaction in an intentional and defined manner (for example as active material, i.e. material for storage of lithium ions, for example, in the lithium ion cell, for example SiO or $SiO_x$). The separating agent is deliberately applied to a polymer that (partly) forms the polymeric binder or is selected such that the polymer can be processed better. The separating agent here is either electrochemically stable in the electrochemical cell and/or takes part in the cell reaction, for example as active material, and/or in the formation of a solid electrolyte interphase outer layer, and hence is irreversibly consumed.

Example 6

The active material is processed together with an amount of a solid-state electrolyte (e.g. oxidic, phosphatic or sulfidic glasses), polymeric binder (e.g. PEO) and a portion of conductive black (e.g. C65) to give agglomerates (for example by kneading, application of solvent, and/or by means of a fluidized bed process). The agglomerates are mixed with the process auxiliary in order to be able to move the agglomerates easily counter to one another in the course of rolling or possibly extruding. Subsequent forming of the film by extruding a film or rolling the agglomerates together in a calender to form a film. If required, additional amounts of solid-state electrolyte or active material, either in pretreated or non-pretreated form, are added in the film formation.

Example 7

The procedure is analogous to example 6, except that no active material is used; instead, only an amount of a solid-state electrolyte, polymeric binder (e.g. PEO) and a portion of conductive carbon black (e.g. C65) are processed to give agglomerates (for example by kneading, application of solvent and/or by means of a fluidized bed method). The further processing, possibly with further solid-state electrolyte, is analogous to example 6.

The invention is not limited to the working examples described here and the aspects emphasized therein. Instead, a multitude of modifications within the realm of activity of a person skilled in the art are possible within the scope defined by the claims.

The invention claimed is:

1. A process for producing a composite material for an electrode of an electrochemical energy storage means, the process comprising:
   mixing at least one particulate material and at least one polymeric binder, and
   mechanically processing the at least one particulate material and the at least one polymeric binder in the presence of at least one process auxiliary to provide a composite material, wherein the particulate material comprises at least one electrode active material for an electrochemical energy storage means,
   wherein the process is essentially solvent-free,
   wherein the at least one process auxiliary reduces the mechanical and/or chemical interaction between the surfaces of the at least one particulate material and of the at least one polymeric binder,
   wherein the mechanically processing is selected from the group consisting of kneading, extruding, calender rolling, and a combination thereof,
   wherein a weight ratio of the at least one process auxiliary to the at least one polymeric binder is within a range from 3:10 to 0.1:20,
   wherein the at least one process auxiliary is in a form of particles, and a ratio of an average particle diameter of the at least one particulate material to an average particle diameter of the at least one process auxiliary is within a range from 2000:1 to 0.4:1,
   wherein the composite material is essentially free of pores, and
   wherein the at least one process auxiliary is a separating agent.

2. The process according to claim 1, further comprising mixing the at least one particulate material, the at least one polymeric binder, and the at least one process auxiliary prior to the mechanically processing.

3. The process according to claim 1, wherein the weight ratio of the at least one process auxiliary to the at least one polymeric binder is within a range from 2:10 to 0.1:10.

4. The process according to claim 1, wherein the at least one particulate material comprises at least one electrode active material for an electrochemical energy storage and the at least one polymeric binder comprises at least one polymer electrolyte.

5. The process according to claim 1, wherein the at least one particulate material is in an amount of at least 85%, based on a total weight of the composite material.

6. The process according to claim 1, wherein the composite material is in a form of a homogeneous film having a thickness of less than 300 µm.

7. A composite material comprising at least one particulate material, at least one polymeric binder, and at least one process auxiliary, characterized in that a weight ratio of the at least one process auxiliary to the at least one polymeric binder is within a range from 3:10 to 0.1:20, wherein the composite material is essentially free of pores.

8. The composite material according to claim 7, wherein the at least one particulate material comprises at least one electrode active material and the at least one polymeric binder comprises at least one polymer electrolyte.

9. The composite material according to claim 7, comprising:
   (i) 85.0% to 98.9% by weight of the at least one particulate material;
   (ii) 1.0% to 14.9% by weight of the at least one polymeric binder; and
   (iii) 0.1% to 3.0% by weight of the at least one process auxiliary.

10. An electrochemical energy storage device or an electrochemical energy converter device having an electrode comprising the composite material according to claim 7.

11. An electrochemical energy storage device or electrochemical energy converter device comprising the composite material according to claim 7.

12. A process for producing a composite material, the process comprising:
   mixing at least one particulate material and at least one polymeric binder, and
   mechanically processing the at least one particulate material and the at least one polymeric binder in the presence of at least one process auxiliary to provide a composite material,
   wherein the process is essentially solvent-free,
   wherein the at least one process auxiliary reduces the mechanical and/or chemical interaction between the surfaces of the at least one particulate material and of the at least one polymeric binder,
   wherein the mechanically processing is selected from the group consisting of kneading, extruding, calender rolling, and a combination thereof,
   wherein a weight ratio of the at least one process auxiliary to the at least one polymeric binder is within a range from 3:10 to 0.1:20, and
   wherein the at least one process auxiliary is a separating agent.

13. The process according to claim 1, wherein the separating agent is selected from the group consisting of organic oxides including $SiO_2$, $Al_2O_3$, $ZrO$, $B_2O_3$, or $PbO$, carbides including $SiC$, and nitrides including $BN$.

* * * * *